United States Patent [19]

Kondo

[11] 4,051,499
[45] Sept. 27, 1977

[54] LINEAR MOTOR-DRIVEN FOCAL PLANE SHUTTER

[75] Inventor: Toshihiro Kondo, Chofu, Japan

[73] Assignees: Toshihiro Kondo, Chofu; Fuji Photo Film Co., Ltd., Minami-ashigara, both of Japan

[21] Appl. No.: 677,392

[22] Filed: Apr. 15, 1976

[30] Foreign Application Priority Data

Apr. 18, 1975 Japan .................................. 50-47867

[51] Int. Cl.² .............................................. G03B 9/42
[52] U.S. Cl. ..................................... 354/234; 354/248
[58] Field of Search ............... 354/234, 241, 242, 245, 354/246, 247, 248, 249, 235; 335/302, 303

[56] References Cited

U.S. PATENT DOCUMENTS

| 2,702,500 | 2/1955 | DeBell | 354/234 |
|---|---|---|---|
| 3,049,982 | 8/1962 | Kendall | 354/234 |
| 3,092,002 | 6/1963 | Frenk | 354/234 |
| 3,513,763 | 5/1970 | Singer | 354/246 |
| 3,563,152 | 2/1971 | Douglas | 354/242 |
| 3,685,423 | 8/1972 | Dahlgren | 354/241 |

*Primary Examiner*—L. T. Hix
*Assistant Examiner*—M. L. Gellner

[57] ABSTRACT

A leading blind and a trailing blind are made of opaque plastic sheet material. Each blind has a thin permanent magnet sealed within it along a plane approximately bisecting its thickness. Along the path of each blind is arranged at least one series of electromagnetic coils. Contactless magnetic or optical means is provided to detect the position of each blind and to sequentially energize the associated series of electromagnetic coils to cause the associated permanent magnet and blind to be driven in the direction in which the coils are sequentially energized in accordance with the principle of a linear motor.

18 Claims, 16 Drawing Figures

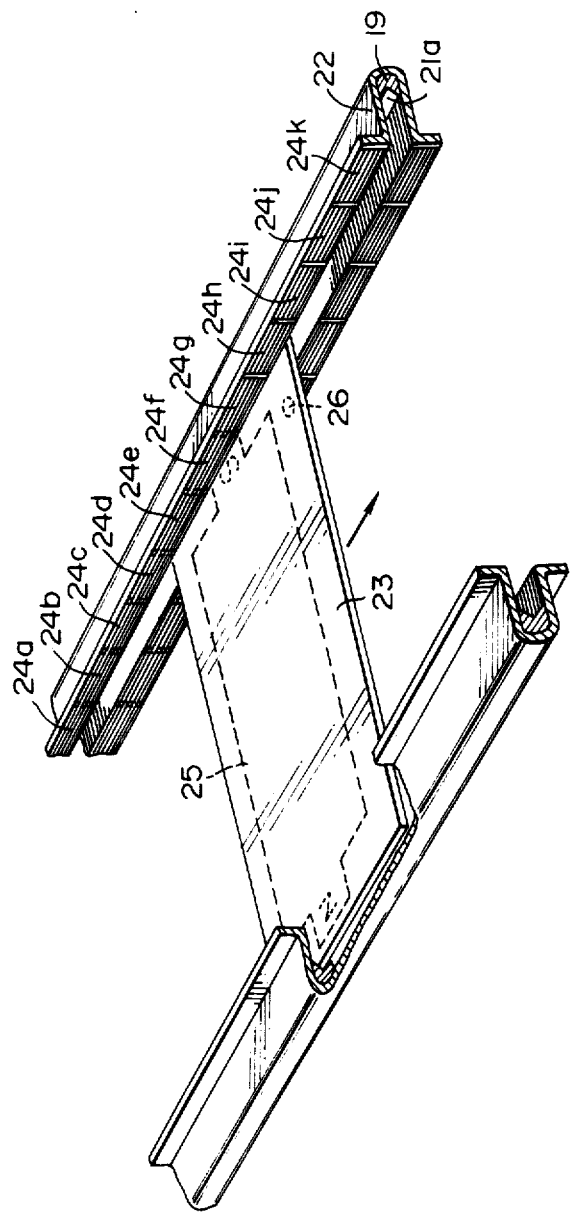

LINEAR MOTOR-DRIVEN FOCAL PLANE SHUTTER

BACKGROUND OF THE INVENTION

1. Field of the Invention

This invention relates to a focal plane shutter, and more particularly to a focal plane shutter the leading and the trailing blind of which are driven by an electromagnetic force utilizing the principle of a linear motor.

2. Description of the Prior Art

In the conventional focal plane shutter, the leading blind and the trailing blind are brought to the charged position and a spring which drives the blinds is charged in response to the film wind-up operation. In this kind of conventional focal plane shutter, it is necessary to provide a transmission device which transmits the motion of the film wind-up lever to the shutter blinds. Such a transmission device is structurally complex and occupies a large amount of space and as a consequence increases the cost of manufacture and the size of the camera in which it is employed.

With the aim of overcoming the above-mentioned defects inherent in the conventional focal plane shutter, the inventor previously invented and applied for patent on (application Ser. No. 527,416 now U.S. Pat. No. 3,987,473 issued Feb. 19, 1976) an electromagnetic focal plane shutter which, by using electromagnetic force to drive the shutter blinds in accordance with the principle of a linear motor, provided a simpler and more compact focal plane shutter mechanism.

SUMMARY OF THE INVENTION

The primary object of the present invention is to provide an improvement on the focal plane shutter described in U.S. patent application Ser. No. 527,416 and thereby to provide a linear motor-driven focal plane shutter of even simpler, lighter and more compact in construction.

Another object of the present invention is to provide a linear motor-driven focal plane shutter which gives rise to very little impact upon completion of its run.

Still another object of the present invention is to provide a linear motor-driven focal plane shutter which is free from breakdowns or malfunctions which are likely to occur in an electrically operated device because of poor electrical contact.

As is well known, a focal plane shutter comprises a leading blind which covers the film to prevent light from gaining access thereto when exposure is not desired and a trailing blind which at this time is in the stand-by state. When the shutter is released, the leading blind first runs to uncover and expose the film to light and then the trailing blind runs to recover the film and shut out light. The exposure time is determined by the time lag between the start of the two blinds.

The focal plane shutter in accordance with the present invention is characterized in that the leading blind and the trailing blind are driven by electromagnetic force utilizing the principle of the linear motor. The leading blind and the trailing blind are both formed of opaque plastic sheets each having a sheet of permanent magnet material embedded therein along a plane that bisects the thickness of the plastic sheet, at least two series of magnetic coils are arranged at fixed positions within the camera opposite the shutter blinds to form a linear motor in conjunction with the permanent magnets embedded therein.

The focal plane shutter in accordance with this invention is further characterized in that the momentary position of the shutter blinds in the course of being driven by the sequentially energized magnetic coils of said group of magnetic coils is detected contactlessly by optical or electrical means and the magnetic coils are energized one after the other in the direction of travel of the blinds in accordance with the so detected position thereof.

As the shutter device in accordance with the present invention is driven by electromagnetic force utilizing the principle of the linear motor, it is of simple construction involving few parts and can consequently be made compact.

The use of plastic shutter blinds not only reduces manufacturing cost but also, since the blinds are light in weight, makes it possible to drive the blades at high speed. Having little mass, the blades give rise to very little impact even when driven at high speed and therefore do not contribute to camera shake.

Furthermore, the fact that the permanent magnets forming a part of the linear motor are sealed within the respective shutter blinds means that the space provided for the blinds to run in can be made very small in depth since there is no possibility of the magnets coming into contact with other parts of the camera.

Also, in one preferred embodiment of the present invention, the magnetic coils are sequentially energized by a contactless method which does away with the need for brushes and eliminates breakdowns and malfunctions resulting from poor electrical contact.

Various other objects, features and advantages of the present invention will become more apparent by reference to the following detailed description of preferred embodiments thereof taken in conjunction with the accompanying drawings as follows.

BRIEF DESCRIPTION OF THE DRAWING

FIGS. 3A and 3B are sectional views taken along the line IIIA—IIIA of the embodiment shown in FIG. 2 in which FIG. 3A shows the state of the shutter prior to release and FIG. 3B shows the state of the shutter after the shutter blinds have completed their run.

FIG. 4 is a partial perspective view showing another embodiment of the present invention.

PREFERRED EMBODIMENTS OF THE INVENTION

Figure 1:
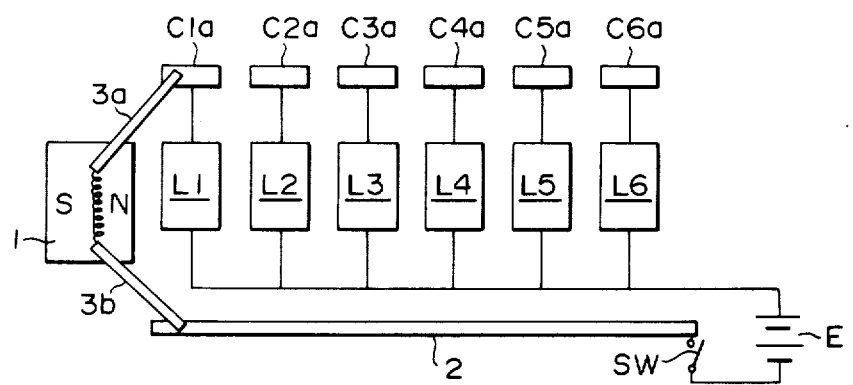
FIG. 1 is a schematic view showing the operating principle of the linear motor used in the shutter mechanism of the present invention.

Referring to FIG. 1 which schematically illustrates the operating principle of the linear motor-driven focal plane shutter in accordance with the present invention, printed coils L1 to L6 are arranged in a row so that when one of these print coils is energized to produce a magnetic field having its south pole in the direction of permanent magnet 1 which has its north pole facing the row of printed coils, the permanent magnet 1 will be attracted toward the energized coil. One terminal lead of each of print coils L1 to L6 is connected to the positive side of electric source E while the remaining terminal lead of each print coil is connected to one of the separate contacts C1a to C6a. The negative side of electric source E is connected to long, continuous contact 2 via switch SW. Permanent magnet 1 is provided with a pair of brushes 3a and 3b, one (3a) of which is in contact with contact C1a and the other (3b) of which is in contact with contact 2. Brushes 3a and 3b are connected to each other by a conductor. When, in the state shown in FIG. 1, switch SW is thrown on, current passes via brush 3a in contact with contact C1a and brush 3b in contact with contact 2 to energize coil L1. Permanent magnet 1 is consequently drawn to the right toward coil L1 and as a result brush 3a moves off contact C1a and comes into contact with contact C2a of coil L2. Thus coil L1 is deenergized and coil L2 is energized to draw permanent magnet 1 further to the right. By sequentially energizing coils L1 to L6 in this manner, permanent magnet 1 is caused to travel progressively in the direction in which the coils are sequentially energized. To accomplish this effect it is only necessary that the brushes 3a and 3b energize one coil ahead of the coil which permanent magnet 1 has reached so that, for example, coil L2 is energized when permanent magnet 1 reaches coil L1.

The function of brushes 3a and 3b is thus to energize the next succeeding coil as soon as permanent magnet 1 has completed its travel as a result of the attraction of any given coil. This, in effect, amounts to detecting the momentary position of permanent magnet 1 and energizing the coil next following the one it has reached at that moment.

From this it is clear that even without such a pair of brushes it is possible to detect the momentary position of permanent magnet 1 by, for example, an optical means employing a combination of a light emitting element and a light receiving element or a magnetic means employing magnetic detection elements and to energize the coil next following the one the permanent magnet 1 has reached at that moment. Although this method of contactless detection is well known, it is applied here to good advantage in that it is a brushless method and is therefore free from problems arising from poor electrical contact. (This matter will be taken up in more detail below.)

Figure 2:
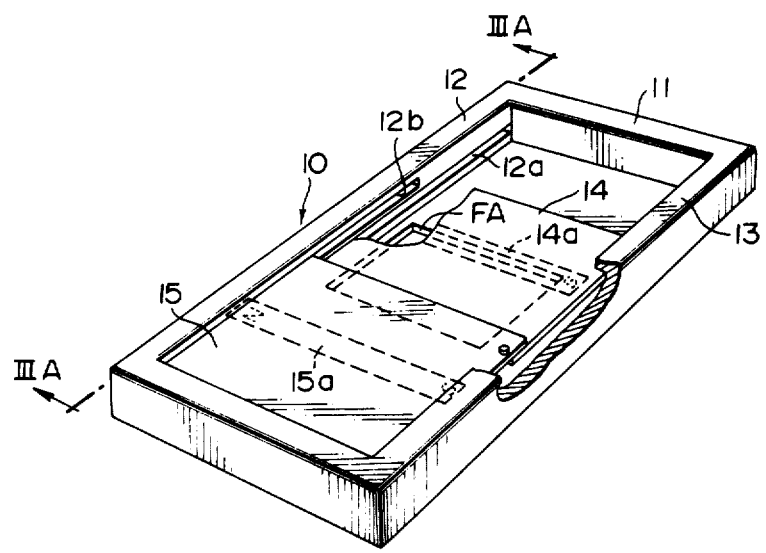
FIG. 2 is a perspective view of one embodiment of the linear motor-driven focal plane shutter according to the present invention.

FIG. 2 shows a perspective view of one embodiment in accordance with this invention. Linear motor-driven shutter 10 comprises a shutter frame 11 having an upper frame edge 12 and lower frame edge 13 wherein are provided a first pair of guide grooves 12a and 13a (13a not shown) and a second pair of guide grooves 12b and 13b (13b not shown), a leading blind 14 slidably accommodated in said first pair of guide grooves 12a and 13a and a trailing blind 15 slidably accommodated in said second pair of guide grooves 12b and 13b. Leading blind 14 and trailing blind 15 are made of opaque plastic and respectively have sheets of permanent magnet material 14a and 15a embedded therein along a plane bisecting the thickness thereof. The sheets of permanent magnet material are oriented so as to have their poles facing frame edges 12 and 13. Guide grooves 12a and 13a accommodating leading blind 14 extend from the left edge of film aperture FA to the right end of shutter frame 11 while guide grooves 12b and 13b accommodating trailing blind 15 extend from the right edge of film aperture FA to the left end of shutter frame 11. (See FIG. 3A.)

Figure 3A:
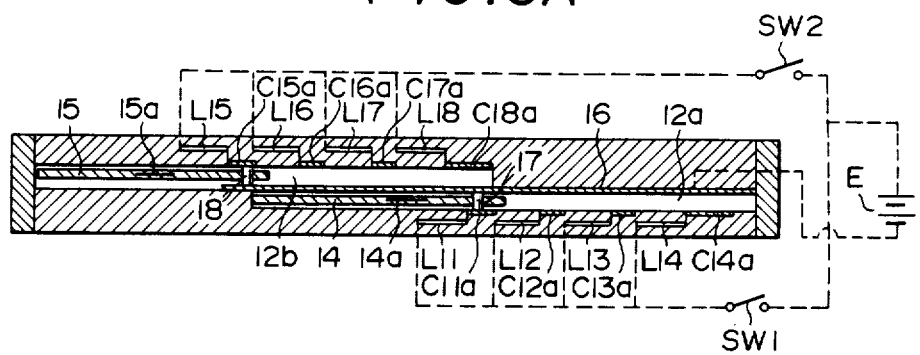
Figure 3B:
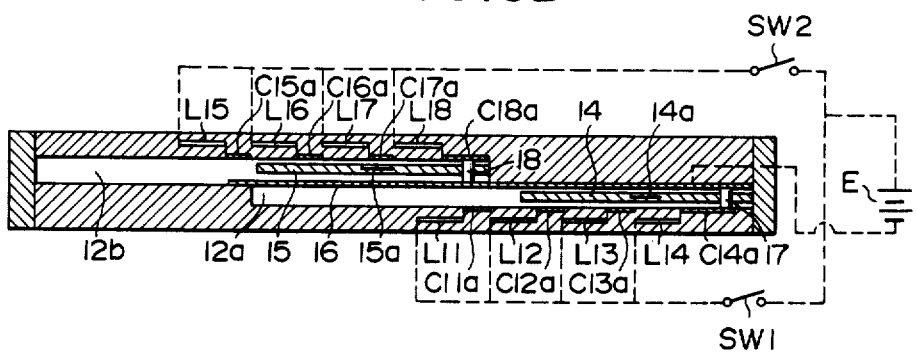

Shutter frame 11 provided with guide grooves 12a, 12b, 13a and 13b is, as shown in FIGS. 3A and 3B, further provided in each of its upper and lower edges 12 and 13 with a group of print coils L11 to L14. (As the edges 12 and 13 are of identical construction, only that of edge 12 will be described.) The group of print coils L11 to L14 are embedded in edge 12 directly below groove 12a. Each of print coils L11 to L14 has one of its terminal leads connected to one of the contacts C11a to C14a exposed on the bottom side of groove 12a and has its other terminal lead connected to the positive side of electric source E via switch SW1. The connection is such that the upper surface of print coils L11 to L14 takes south polarity when electric current passes therethrough.

In the same manner, a group of print coils L15 to L18 is provided above guide groove 12b with one terminal lead of each print coil connected to one of contacts C15a to C18a exposed on the top side of groove 12b and the other terminal lead thereof connected to the positive side of electric source E via switch SW2. Along the border between guide groove 12a and guide groove 12b is provided contact 16. Contact 16 is exposed to both guide groove 12a and guide groove 12b and is electrically connected to the negative side of electric source E. Leading blind 14 and trailing blind 15 have, at a point near their respective right ends, pin-shaped brushes 17 and 18 which are so provided as to project from both surfaces of the blinds and make contact with both sides of the related groove.

In FIG. 2 and FIG. 3A the shutter is shown in the closed state with leading blind 14 positioned above film aperture FA and preventing light from reaching the film. Trailing blind 15 at this time remains in stand-by position on the left.

If when the shutter is in this state the shutter button (not shown) is pressed to close switch SW1, current flows through contact 16, brush 17 and contact C11a to energize print coil L11 and cause it to attract permanent magnet 14a of leading blind 14. Leading blind 14 thus begins to run to the right so that brush 17 moves away from contact C11a and comes in contact with the next contact C12a. As a result, print coil L11 is deenergized and the next print coil L12 is energized to draw permanent magnet 14a still further to the right. As leading blind 14 continues to run to the right in this manner, film aperture FA is progressively opened from the left. Next, after the lapse of a period of time equal to the desired shutter speed, switch SW2 is closed so that trailing blind 15 is caused to run to the right in precisely the same way as leading blind 15 and as a consequence film aperture FA is progressively closed from the left.

After the shutter action has been completed in the manner just described, the shutter blinds can be returned to their initial closed state either by first cutting off the supply of current to the respective coils and then allowing the blinds to be pulled back under the force of a weak spring or by energizing print coils L11 to L18 in the opposite polarity. In either case, in order to assure that the film is not subjected to any undesired further exposure, the two blinds should either be returned simultaneously or trailing blind 15 should be returned only after leading blind 14 has been returned to its initial position.

FIG. 3B shows the state of the shutter upon completion of the shutter action.

Another embodiment of the invention is shown in FIG. 4. This embodiment is characterized in that the group of magnetic coils which cooperates with the permanent magnet to drive the shutter blinds is so arranged that the magnetic field thereof acts on the permanent magnet with particularly high efficiency. (For sake of simplicity, the film aperture and other portions not essential to an explanation of the blind driving system are not shown in FIG. 4.)

Figure 5A:
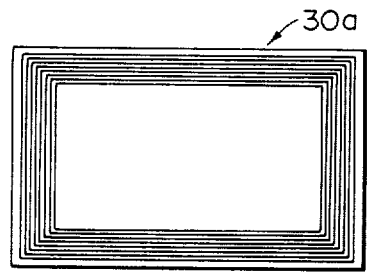
FIG. 5A is a front view of a print coil element used in the embodiment shown in FIG. 4.
Figure 5B:
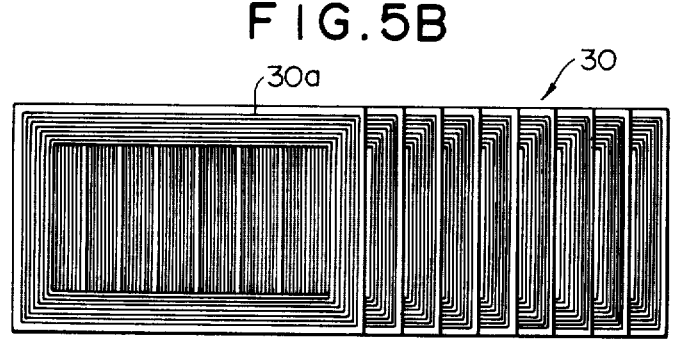
FIG. 5B is a front view showing a coil plate formed of a number of coils shown in FIG. 5A.

As shown in FIG. 4, the shutter frame is composed of two identical members only one of which will be described here. Shutter frame member is formed of a print coil plate 30 such as that shown in FIG. 5B and further comprises a guide groove 21a formed of a U-shaped trough 22 having a plastic member 19 at the bottom thereof. Blind 23 is slidably retained in guide groove 21a.

Figure 5C:
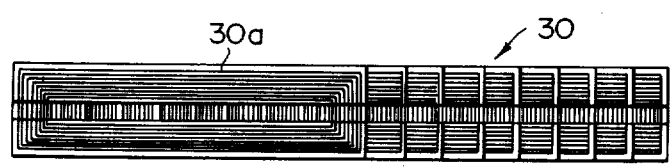
FIG. 5C is a front view of a coil plate shown in FIG. 5B after insertion into a U-shaped trough.
Figure 5D:
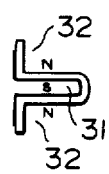
FIG. 5D is an end view of a U-shaped trough into which a coil plate as shown in FIG. 5B has been inserted.

Print coil 30 is formed of a row of overlapping rectangular print coil elements 30a each of which is slightly offset in its longer direction from the preceding member of the row. The individual print coil elements are of the configuration shown in FIG. 5A and are formed by vacuum evaporation of copper or silver on a rectangular sheet of polyester to a thickness of 5 to 10 microns and then subjecting the deposited material to photo-etching to produce the coils. When the active part of coil plate 30 is bent into the shape of an angular or rounded "U" as shown in FIGS. 5C and 5D and an electric current is passed therethrough, the inwardly bent portion (indicated by 31) and the outwardly bent portion (indicated by 32) are excited in opposite polarity. (In FIG. 5D, the current has been passed in the direction which gives south polarity to the inwardly bent portion 31.)

The aforementioned shutter frame member is comprised of a so bent print coil plate further provided with an integrally connected nylon or polycarbonate guide rail so as to form the guide groove 21a. The shutter frame member thus comprises a series of independent print coils 24a, 24b, 24c . . . 24k while blade 23 is made of the same opaque plastic sheet material as mentioned in the previous embodiment. Sealed within blind 23 are a permanent magnet 25 and, at a position separated from permanent magnet 25, a position indicator magnet 26. As will be described in more detail later, position indicator magnet 26 provides a magnetic field for detection by a detection circuit. As the position of position indicator magnet 26 is indicative of the position of blind 23, the detection circuit is able to detect the position of the blind by detecting position indicator magnet 26 and to energize print coils 24a to 24k in sequence at the proper time. Position indicator magnet 26 is provided on blind 23 at a point which falls outside of print coils 24a to 24k when blind 23 is inserted into guide groove 21a.

Figure 6:
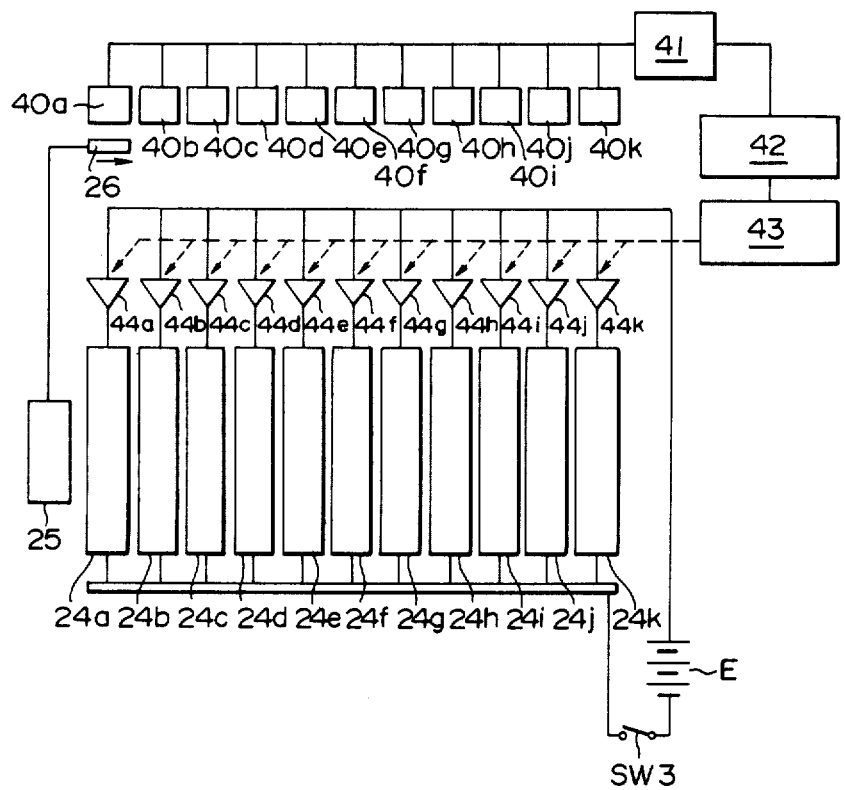
FIG. 6 is a schematic view illustrating the principle of operation of the embodiment shown in FIG. 4.

A circuit for sequentially energizing print coils 24a to 24k in response to the position of blind 23 is shown in FIG. 6 wherein 40a, 40b . . . 40k are magnetic field detectors provided at positions corresponding to the positions of print coils 24a to 24k in FIG. 4. (Detectors 40a to 40k are not shown in FIG. 4.) Each of magnetic field detectors 40a to 40k is designed to feed its own characteristic signal to amplifier 41 when it comes within the magnetic field of position indicator magnet 26.

As illustrated, one side of each of print coils 24a to 24k is connected to electric source E through an associated one of switching elements 44a to 44k. Swtiching elements 44a to 44k are controlled by selector circuit 42 and switching circuit 43 so that the switching element associated with the one of magnetic field detectors 40a to 40k which is within the magnetic field of position indicator magnet 26 is made conductive. For example, when magnetic field detector 40a comes within the magnetic field of position indicator magnet 26, switching element 44a is made conductive so that print coil 24a is energized and attracts permanent magnet 25 to begin the run of blind 23. As a consequence, magnetic field detector 40b comes within the magnetic field of position indicator magnet 26 and switching element 44b becomes conductive to energize print coil 24b. In this manner, blind 23 is caused to run to the right by the sequentially energized print coils.

Although it is of course possible in this embodiment to use brushes similar to those described in the first embodiment instead of the contactless system just described, a contactless system is advantageous in that it is free from frictional drag and is not susceptible to malfunction as a result of poor electrical contact.

Figure 7:
FIG. 7 is a partial perspective view of a guide rail for use in the embodiment shown in FIG. 4.

In constructing a shutter apparatus, two devices of the type shown in FIG. 4 are stacked one on the other and one is used to drive the leading blind while the other is used to drive the trailing blind. Alternatively, a guide rail having two grooves 21b, 21c such as shown in FIG. 7 can be provided at the bottom of U-shaped trough 22 of each shutter frame member to slidably accommodate a leading blind in one of said grooves and a trailing blind in the other. It is sufficient to provide the print coils only along those parts of the shutter frame where they are necessary for driving the shutter blinds.

Although this embodiment has been described as using a contactless system employing magnetic detectors, it is also possible to use any of various other known systems. For example, a number of photoelectric switches each comprising a light emitting element and a light receiving element can be provided along the course of travel of the blind so that interruption of the light path by a light interrupter on the blind, causes electric current to start flowing in the succeeding print coil. Conversely, a small hole can be provided in the blind and the initiation of current flow to the succeeding print coil can be triggered by the arrival of the small hole at said light path. In either of these types of photoelectric detection, care must be taken not to allow the light from the light emitting element to reach and expose the film.

In the two embodiments described to this point, both the leading blind and the trailing blind were assumed be single blades each of an area large enough to fully cover the film aperture. However, with the aim of reducing the amount of space taken up within the camera, it is possible employ a blind having a coilable tail section as described hereinafter.

Figure 8A:
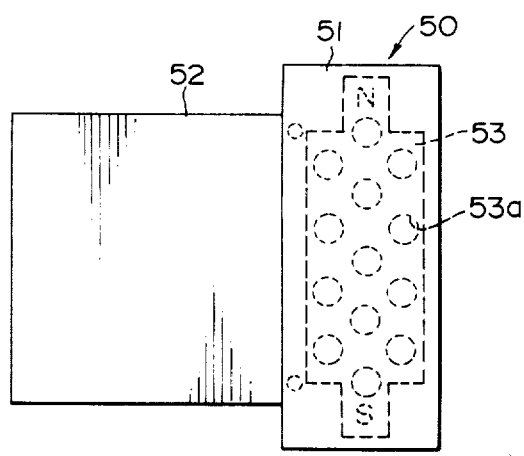
FIGS. 8A and 8B are respectively a plan view and a sectional side view of a blind for use in the embodiment shown in FIG. 4.
Figure 8B:
Figure 9:
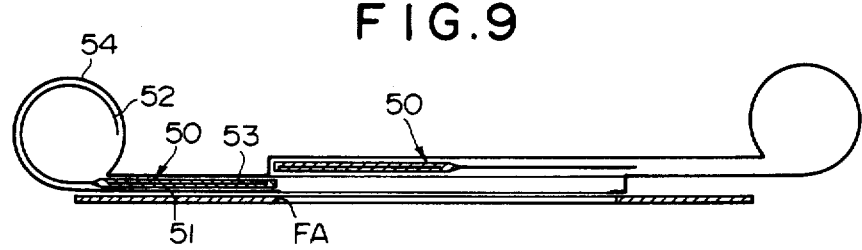
FIG. 9 is a simplified sectional side view of an embodiment of this invention adapted to use shutter blinds of the type shown in FIG. 8A and FIG. 8B.

An embodiment of such a coilable blind is shown in FIG. 8A. Blind 50 is comprised of a magnet portion 51 and an integrally formed tail portion 52, the combined area of which is sufficient to cover the film aperture. Magnet portion 51 is formed of opaque plastic sheet material and has a permanent magnet 53 enclosed therein along a plane approximately bisecting the thickness of the sheet. The overall thickness of this portion is between 0.3 and 0.5 mm. Permanent magnet 53 is between 0.1 and 0.2 mm thick and has a plurality of holes 53a. Holes 53a serve both to reduce the weight of blind 50 and to increase the adherence between magnet 53 and the plastic sheet material. Tail portion 52 is formed even thinner than magnet portion 51 and has a thickness of between 0.05 and 0.2 mm. (See FIG. 8B.) As shown in FIG. 9, a camera employing such a blind 50 is provided at either side of its shutter frame with a drum reel 54 into which tail portion 52 is coiled so as to reduce the overall length of the shutter mechanism. Drum reel 54 differs from the drum used to take up the shutter blind in the conventional curtain type focal plane shutter in that it does not have a spring or other widing means and does not require the application of an outside force to draw it out so that no reactive force is generated by the running of the shutter blinds. In the drawing, FA indicates the film aperture.

Figure 10:
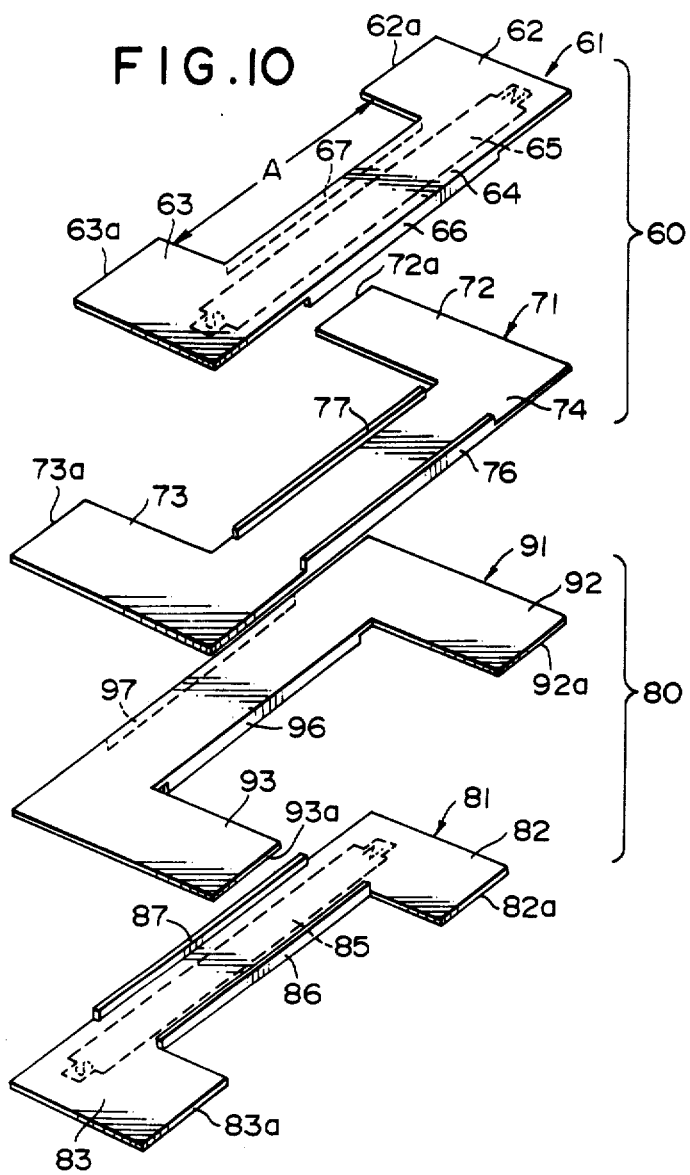
FIG. 10 is an exploded perspective view of two pairs of shutter blades constituting a leading blind and a trailing blind adapted for use in another embodiment of this invention.
Figure 11:
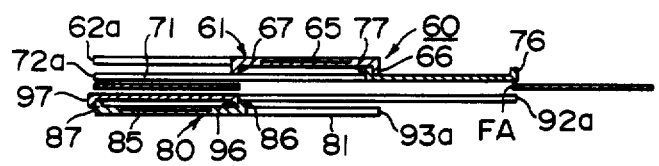
FIG. 11 is a sectional side view of an embodiment of this invention using shutter blinds of the type shown in FIG. 10.

FIGS. 10 and 11 illustrate an embodiment wherein the leading blind and the trailing blind are formed of two blades each.

Referring to FIG. 10, leading blind 60 comprises a first driving blade 61 and a first follower blade 71. First driving blade 61 is made of opaque plastic sheet material and has an intermediate portion 64 and two end portions 62 and 63 extending in parallel to each other. A permanent magnet 65 is sealed within intermediate portion 64. Intermediate portion 64 is further provided at the opposite edges thereof with a pair of vertically bent portions 66 and 67. First follower blade 71 is not provided with a permanent magnet, but, similarly to first driving blade 61, comprises two parallel end portions 72 and 73 and an intermediate portion 74 having vertically bent portions 76 and 77. The end portions 72 and 73 of first follower blade 71 are made longer than those of first driving blade 61 for a reason that will become clear later.

Trailing blind 80 is comprised of a second driving blade 81 and a second following blade 91 and is of precisely the same construction as leading blind 60.

The blades of the two blinds are assembled and used in the fashion illustrated in FIG. 11 which shows a sectional side view of a shutter mechanism according to this invention wherein the shutter blinds are in the closed state. More specifically, film aperture FA is covered by leading blind 60 in such manner that one bent portion 66 of first driving blade 61 is in contact with one bent portion 77 of first following blade 71. At this time back ends 62a and 63a of end portions 62 and 63 of first driving blade 61 and back ends 72a and 73a of end portions 72 and 73 of first following blade 71 are situated at the left ends of their respective guide grooves. (Neither the guide grooves nor the back ends 63a and 73a are shown in FIG. 11.) It is obvious that this arrangement requires that end portions 72 and 73 of first following blade 71 be made longer than the end portions 62 and 63 of first driving blade 61 by an amount equal to the width of intermediate portion 64. Intermediate portions 64 and 74 are of the same width. The distance between the end portions of each blade (distance A in FIG. 10) is approximately equal to the width of the film aperture. The same dimensional relationships apply in the case of second driving blade 81 and second following blade 91 of trailing blind 80.

When, starting from the covered state shown in FIG. 11, first driving blade 61 is driven to the right by a linear motor system such as described hereinbefore, film aperture FA is progressively opened from the left. In the course of the rightward travel of first driving blade 61, bent portion 67 thereof comes to a point where it abuts on bent portion 77 of first following blade 71 and thereafter first following blade 71 is also pulled to the right until bent portion 76 thereof arrives at the right end of the guide grooves and stops. At this time intermediate portions 64 and 74 are overlapped so that when leading blind 60 has finished its run it is accommodated at the right of film aperture FA in a space which is approximately half as wide as film aperture FA.

After the lapse of a period of time equivalent to the desired shutter speed, second driving blade 81 of trailing blind 80 begins its run to the right so that film aperture FA is progressively covered from the left. In the course of the rightward travel of second driving blade 81, bent portion 87 thereof comes to point where it abuts on bent portion 96 of second following blade 91 and thereafter second following blade 91 is also pulled to the right until back ends 82a, 83a, 92a and 93a (83a and 93a not shown in FIG. 11) of end portions 82, 83, 92 and 93 arrive at the right end of the guide grooves and stop.

By constructing the leading blind and the trailing blind of two blades each as described above, it is possible to accommodate both blinds on either side of film aperture FA in a space whose width is one half the width of film aperture (in the running direction of the blinds). Thus if the blinds are made to run in the lateral direction of the aperture of a 35mm camera, the space required to accommodate the blades is about 18mm on either side (the length of the aperture in this direction being 35mm). If the blinds are made to run vertically, they can be accommodated in about 13mm of space at the top and bottom of the aperture (the width of the aperture in this direction being 25mm).

The method for manufacturing the blinds used in the present invention is described in detail in the specification of application Ser. No. 667,418 filed by the same applicant on Mar. 16, 1976 and now U.S. Pat. No. 4,024,552 issued May 17, 1977. This description is not repeated here since the method for manufacturing the blinds is not directly related to the gist of the present invention.

Being driven by an electromagnetic force employing the principle of a linear motor, the focal plane shutter in accordance with the present invention has no need for a mechanism for transmitting the force charged in a spring as required by conventional shutter driving systems and consequently is very simple in structure and has fewer parts than conventional shutter mechanisms. As a result, a camera employing the shutter in accordance with this invention enjoys both a reduction in size and lower manufacturing cost.

As the shutter blinds employed are of light weight (about 1.0 to 1.5g each), high shutter speeds can be attained with relatively low consumption of electric power. The light weight of the shutter blinds also means a reduction in shutter inertia and a consequent decrease in the amount of camera shake caused by the action of the shutter.

The permanent magnets which constitute a part of the linear motor system are sealed within the shutter blinds so that the depth of the space in which the shutter blinds travel can be made exceedingly small without danger of the blinds or their magnets coming into contact with any other parts of the camera.

The use of a contactless method for sequentially energizing the print coils is also advantageous in that it eliminates both the frictional drag of brushes and the possibility of a malfunction due to poor electrical contact.

I claim:

1. A linear motor-driven focal plane shutter for a camera comprising in combination:
   a flat shutter blind slidable back and forth along a fixed path to open and close the film aperture in the camera,
   a flat permanent magnet sealed within the shutter blind along a plane approximately bisecting the thickness thereof,
   a series of electromagnetic coils arranged in a line in the direction of travel of the shutter blind, said electromagnetic coils being situated along the path followed by a pole of the permanent magnet of the shutter blind,
   means for sequentially energizing the electromagnetic coils to cause the shutter blind in which the associated permanent magnet is sealed to run in the direction in which the electromagnetic coils are energized in accordance with the principle of a linear motor,
   a shutter control circuit for sequentially energizing the series of electromagnetic coils.

2. A linear motor-driven focal plane shutter for a camera as defined in claim 1 wherein the shutter blind is formed of opaque plastic sheet material.

3. A linear motor-driven focal plane shutter for a camera as defined in claim 2 wherein the permanent magnet sealed within the shutter blind has a number of holes therein.

4. A linear motor-driven focal plane shutter for a camera as defined in claim 2 wherein the shutter blind is comprised of a rigid magnet portion wherein the permanent magnet is sealed and a flexible tail portion adaptable to being coiled in a drum reel at one side of the film aperture.

5. A linear motor-driven focal plane shutter for a camera as defined in claim 2 wherein the shutter blind is comprised of a driving blade wherein the permanent magnet is sealed and a following blade, said blades being extended to their combined width when covering the film aperture and being stacked one on top of the other when not covering the film aperture.

6. A linear motor-driven focal plane shutter for a camera as defined in claim 1 wherein said means for sequentially energizing the electromagnetic coils includes a brush located on the shutter blind.

7. A linear motor-driven focal plane shutter for a camera as defined in claim 1 wherein said means for sequentially energizing the electromagnetic coils comprises a position indicator magnet located on the shutter blind, a series of magnetic field detectors and an associated series of switching elements.

8. A linear motor-driven focal plane shutter for a camera as defined in claim 1 wherein said series of electromagnetic coils are comprised of a plurality of print coils.

9. A linear motor-driven focal plane shutter for a camera as defined in claim 8 wherein said plurality of print coils constitute a coil plate which is bent into the shape of "U" for accommodating one edge of the shutter blind.

10. A linear motor-driven focal plane shutter for a camera comprising in combination:
    a leading blind movable back and forth along a fixed path to open and close the film aperture in the camera,
    a trailing blind movable back and forth along a fixed path to close and open the film aperture in the camera,
    a first permanent magnet sealed within the leading blind along a plane approximately bisecting the thickness thereof,
    a second permanent magnet sealed within the trailing blind along a plane approximately bisecting the thickness thereof,
    at least two series of electromagnetic coils arranged in lines in the direction of travel of the leading blind and the trailing blind, each series of electromagnetic coils being situated along the path followed by a pole of the permanent magnet of the associated blind,
    means for sequentially energizing the electromagnetic coils in each series to cause the associated permanent magnet and the blind in which it is sealed to run in the direction in which the electromagnetic coils are energized in accordance with the principle of a linear motor,
    a shutter control circuit for first sequentially energizing the series of electromagnetic coils associated with the leading blind and then after the lapse of a period of time corresponding to the shutter speed sequentially energizing the series of electromagnetic coils associated with the trailing blind.

11. A linear motor-driven focal plane shutter for a camera as defined in claim 10 wherein the leading blind and the trailing blind are formed of opaque plastic sheet material.

12. A linear motor-driven focal plane shutter for a camera as defined in claim 11 wherein the permanent magnet sealed within each shutter blind has a number of holes therein.

13. A linear motor-driven focal plane shutter for a camera as defined in claim 11 wherein each shutter blind is comprised of a rigid magnet portion wherein the associated permanent magnet is sealed and a flexible tail portion adaptable to being coiled in a drum reel at one side of the film aperture.

14. A linear motor-driven focal plane shutter for a camera as defined in claim 11 wherein each shutter blind is comprised of a driving blade wherein the associated permanent magnet is sealed and a following blade, said blades being extended to their combined width when covering the film aperture and being stacked one on top of the other when not covering the film aperture.

15. A linear motor-driven focal plane shutter for a camera as defined in claim 10 wherein said means for sequentially energizing the electromagnetic coils in each series is a brush located on the associated blind.

16. A linear motor-driven focal plane shutter for a camera as defined in claim 10 wherein said means for sequentially energizing the electromagnetic coils in each series comprises a position indicator magnet located on the associated blind, a series of magnetic field detectors and an associated series of switching elements.

17. A linear motor-driven focal plane shutter for a camera as defined in claim 10 wherein each series of electromagnetic coils is comprised of a plurality of print coils.

18. A linear motor-driven focal plane shutter for a camera as defined in claim 17 wherein said plurality of print coils constitute a coil plate which is bent into the shape of "U" for accommodating one edge of the associated blind.

* * * * *